Jan. 1, 1957 A. E. MANN 2,776,335

TRANSMISSION OF COLORED MOTION PICTURES

Filed Nov. 22, 1952 2 Sheets-Sheet 1

Inventor
Alfred E. Mann
by Roberts, Cushman & Grover
att'ys.

Jan. 1, 1957 A. E. MANN 2,776,335

TRANSMISSION OF COLORED MOTION PICTURES

Filed Nov. 22, 1952 2 Sheets-Sheet 2

Inventor
Alfred E. Mann
by Roberts, Cushman & Grover
attys.

United States Patent Office 2,776,335 Patented Jan. 1, 1957

2,776,335

TRANSMISSION OF COLORED MOTION PICTURES

Alfred E. Mann, North Hollywood, Calif., assignor to Technicolor Corporation, Hollywood, Calif., a corporation of Maine Application November 22, 1952, Serial No. 322,075
6 Claims. (Cl. 178—5.4)

Figure 1:
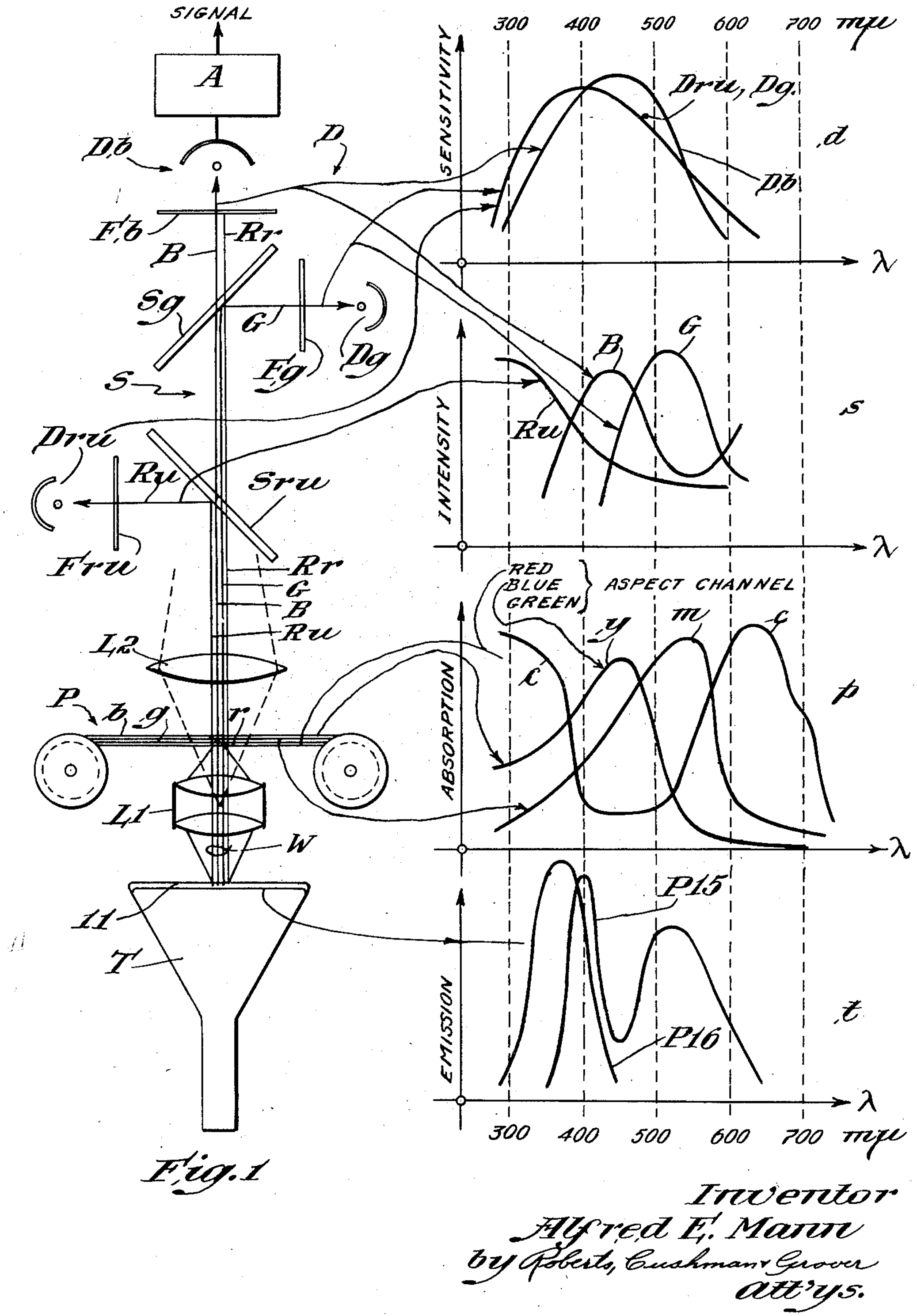

The present invention relates to a method of electrically transmitting information contained in photographic color records, to apparatus for carrying out the method, and to color records especially suited for purposes of the method.

Color motion picture films which are exposed and processed for direct projection on a screen and viewing of the image on the screen, are prepared to provide as nearly as possible a picture which appears natural and pleasing to the eye. If such conventionally exposed and processed films are used in color television pickup apparatus such as flying spot scanners, it is found that the image produced by the television kinescope is unsatisfactory. It was found that a principal reason for that defect is a discrepancy between the light absorption qualities of the record media and the spectral characteristics of the scanner components.

It is a main object of the present invention to provide a method of transmitting colored motion picture film for purposes of television broadcasting which essentially overcomes the defect pointed out above, to provide apparatus for that purpose, and particularly also to provide color motion picture film with absorption characteristics suitable for use in such a process and in such apparatus. Another important object is to provide a color motion picture film which is not only suitable for use in electro-optical modulation channels of the above-mentioned type, but which is also suitable for conventional projection for direct viewing upon a screen. A further object is to provide sets of dyes which, when incorporated in motion picture film as record forming media, are particularly suitable for the above purpose of modulating the scanning light in apparatus constructed for the optical modulation of electric signals such as television broadcasting waves.

According to the invention, light sensitive apparatus is controlled with color aspect records of an original, by making a set of original records of a plurality of color aspects of the original, by printing from this set of original records a set of corresponding modulation records in spectral absorption media which for at least one of the color aspects deviate as to spectral absorption ranges from the ranges which correspond to the color aspects of the original, by scanning the modulation records with a beam of light essentially containing the absorption ranges of the media thereby color modulating the beam, by resolving the beam into modulated component beams the spectral ranges of which are essentially those of respective absorption ranges of the media, and by controlling with the component beams photosensitive impedance means which essentially respond to radiant energy of the respective ranges.

In another aspect of the invention, apparatus is provided for modulating electric signals to reproduce a plurality of color aspects of the original, each of which aspects is defined by a spectral range, which apparatus comprises motion picture film means carrying in register a plurality of color aspect records in colored media which for at least one aspect absorb light which is unrelated to that of the corresponding original aspect, scanning means for projecting the records with a beam of light containing the ranges which are absorbed by the media, and photosensitive impedance means arranged in the beam which responds predominantly to light of the scanning beam.

In still another aspect, the invention contemplates a motion picture film carrying a plurality of registered color aspect records in colored media which for at least one aspect absorb light in a spectral range which is unrelated to that of the corresponding original aspect which the respective record reproduces.

Figure 2:
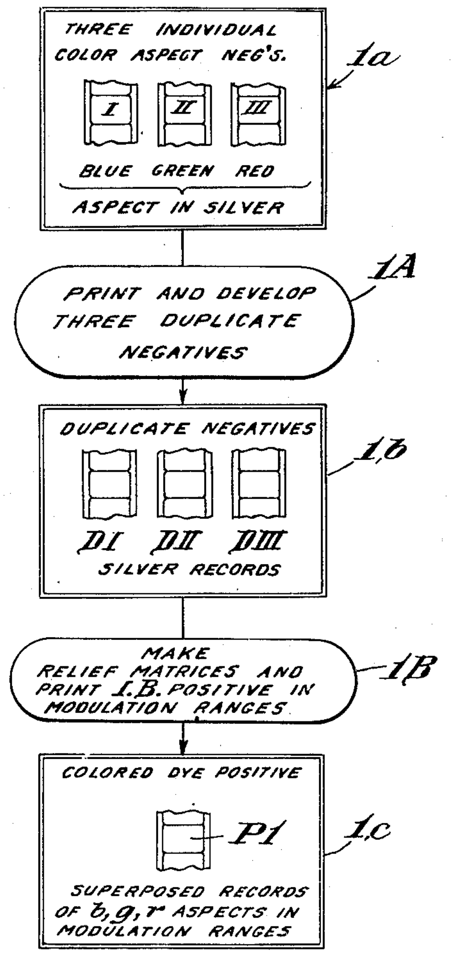
Figure 3:
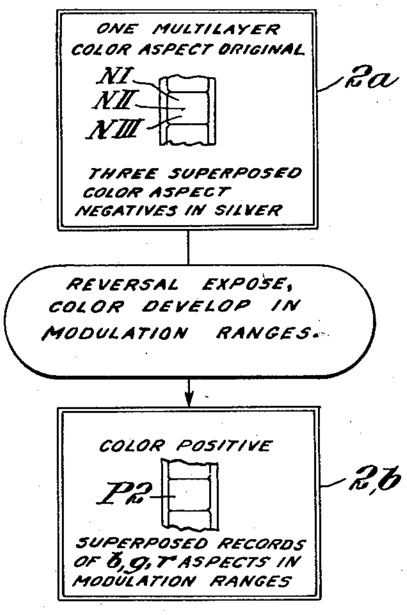
Figure 4:
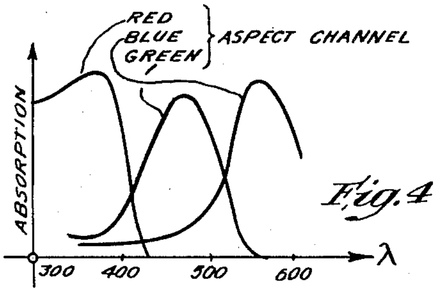
Figure 5:
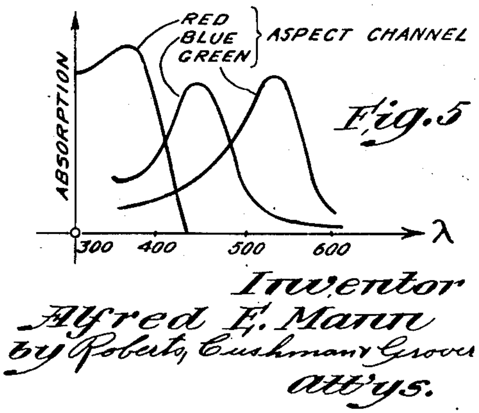
Figure 6:
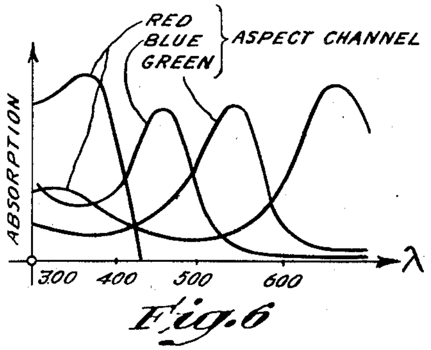

Other objects, aspects and features will appear in addition to those contained in the above statement of the nature and substance including some of the objects of the invention, from the herein presented outline of its theoretical basis and its practical possibilities together with the following description of several typical embodiments illustrating its novel characteristics. These refer to drawings in which Fig. 1 is a diagram illustrating the principle of the invention;

Figs. 2 and 3 are flow diagrams of two practical embodiments of the invention; and Figs. 4 to 6 are absorption characteristics of three sets of dyes suitable for purposes of the invention.

Fig. 1 shows diagrammatically a flying spot scanning arrangement according to the invention and, juxtaposed to its essential components, the spectral characteristics thereof. A flying spot cathode ray tube T of known design incorporates an electron responsive screen 11 made of a mixture of two phosphors, in the present instance those available under the trade designations P15 and P16, whose emission curves are shown at *t*. An objective lens L1 images the flying spot on the plane of film record P and a collector lens L2 projects a well defined narrow modulating beam towards the detectors D, lens L2 focusing the pupil of lens L1 onto the respective photo-cathodes.

The film P carries three superimposed color aspect records in appropriately color selective media, as indicated at *p* for one of the embodiments of the invention. The color aspect records of P and their corresponding absorption characteristics are indicated at *b, g, r* and *y, m, c* respectively which are the designations herein used for the blue, green and red color aspect records and the corresponding subtractive absorption ranges yellow, magenta and cyan, respectively. It is expressly understood that the absorption ranges are not in any way limited by these designations, since deviation from conventional absorption ranges is one of the main characteristics of the invention.

S denotes a color selective arrangement of light dividers S*g*, S*ru* which can incorporate semi-reflecting metallic coatings, or optical interference coatings which transmit and reflect selected spectral ranges. Auxiliary absorption filters F*b*, F*g*, S*ru* can be provided to eliminate undesirable spectral ranges from the three color aspect paths B, G, R into which the beam W from the flying spot is resolved. For purposes of the example specifically illustrated in Fig. 1, and in keeping with the above mentioned characteristic of the invention, the red aspect path comprises a component beam R*r* corresponding to visually effective red light, and a component beam R*u* corresponding to photoelectrically effective ultraviolet light.

Three photoelectric detectors each including a phototube for example of the multiplier type are indicated at D*b* for the blue beam B, at D*g* for the green beam and at D*ru* for the red beam R*u*. An amplifying arrangement A receives input signals from the three photosensitive pickup components D and furnishes an output signal which is in any desirable manner modulated in accordance with three color aspect records *b, g, r* on film P. Each color aspect record on P absorbs a certain spectral range, all ranges being essentially contained in the original beam W emitted by the flying spot. The three component beams B, G, R, the latter composed of R*r* and R*u* are differentiated by the light dividing device S as to spectral range such as to deliver to the respective photosensitive component D*b*, D*g*, D*ru* the range which is absorbed by a corresponding color aspect record *b*, *g*, *r*, of P. Fig. 1 indicates at *s* the selectivity of the beam splitter S by way of the intensity characteristics of beams B, G, R*u*, and at *d* the sensitivities of the photosensitive components D*b*, D*g*, D*ru*.

Since flying spot scanners must use phosphors with very short persistence times and since phosphors having significant red light emission have considerably longer persistence times than those emitting short wave lengths, it is advantageous to use phosphors which have relatively speaking no significant red light emission. The emission characteristic *t* of Fig. 1 is typical of a short persistence screen made with available phosphors, and it will be noted that this composite phosphor has little red but considerable ultraviolet emission. This is filtered out in conventional flying spot scanners. As shown at *d* of Fig. 1, the sensitivities of the photoelectric detecting devices of the type used in such scanners are mainly in the ultraviolet and blue regions of the spectrum, extending into the green region but hardly at all into the red.

In accordance with the present invention physiologically ineffective spectral ranges such as corresponding to the ultraviolet phosphor emission and photocell sensitivity indicated in Fig. 1, are utilized to aid the detection of at least one of the three color records of the subtractive color print P. It is however expressly understood that the invention is not limited to utilization of the ultraviolet sensitivity and emission qualities of components of systems of this type, but that it applies to all arrangements whose components are spectrally correlated for optimum effectiveness although their characteristics may not appreciably correspond to the psycho-physiological ranges used for recording the color aspects. It will be further understood that, if ultra-violet light is used, the optical path which carries such light is constructed to transmit energy of that wave length range, which is easily possible with conventional means.

The color records P can be prepared in various ways, such as by imbibition dye transfer from a blank film, or by color development in a multilayer film. In this context it will be understood that the terms monopack, integral tripack, or multilayer film are used interchangeably in this art, meaning in all instances superimposed emulsion layers of selective sensitivity, or mosaic emulsions of similar selectivity. Auxiliary components can be incorporated, such as filter layers, color formers, antihalation layers, and barrier layers.

In a preferred embodiment, the records on film P have a reduced density range of approximately 1.8 which provides faithful transmission and modulation within an electro-optical transmission channel such as indicated in Fig. 1.

As shown in Fig. 1, the modulation dye absorption ranges according to the invention such as for example shown at *p*, approximately match those spectral characteristics of the other components of the modulating channel which are instrumental for the efficient and faithful translation of the optical signals, laid down in record P, into the electrical signal output of A. Thus, the absorption between 300 and 400 m$\mu$ of medium *r* and the absorption ranges of media *b* and *g* approximately fit the principal emission range at *t*, the beam selectivity at *s* and the photo-cathode sensitivity at *d*. Fairly uniform transmission throughout the channel, from T to A, is thus assured. The filters can be dispensed with if the light dividers together with the phototubes separate the three records with sufficient accuracy. If filter F*b* is omitted, the red light falls ineffectively on the phototube D*b* in the blue beam.

Fig. 1 also illustrates another important aspect of the invention namely the possibility of providing, in addition to satisfactory electro-optical modulation, equally satisfactory visual observation of the record in question. This is obtained by reproducing the red color aspect not only in an electro-optically satisfactory, for example an ultraviolet, range but in addition in a visually satisfactory absorption range such as the minus red or cyan range, both indicated at *c* of diagram *p*. A film P carrying its record in terms of the media illustrated at *p* can be used for satisfactory television transmission as well as for conventional motion picture projection, with the attendant advantages. As will appear from the specific embodiments now to be discussed, this result can be obtained in various ways.

Fig. 2 illustrates one mode of preparing the record P, in colored media according to the invention, as follows:

Three individual color aspect records I, II, III are provided in the form of conventional silver negatives exposed in a three-strip camera. As indicated in box 1*a* of Fig. 2, these silver negative records represent the blue, green and red aspects of the original. The three negatives are printed and developed to form three duplicate negatives. From these duplicate negatives, shown at DI, DII, DIII in box 1*b* of Fig. 2, relief matrices are formed by a conventional wash off relief process, and from these matrices positive dye prints are made by means of imbibition transfer. Box 1*c* shows the positive P1 with the three superposed modulation dye records of the blue, green and red aspects. The general absorption characteristics of these dyes are illustrated in Fig. 1, as above discussed. Specific examples for appropriate media and their application will be given below.

The above technique permits particularly easy contrast control of the final positive P. Similar results can be obtained by printing the silver negatives indicated at 1*a*, directly on special, now well known differentially sensitized matrix stock which permits contrast control with the aid of filters interposed in the printing light. A green absorbing filter is advantageously used to provide the abovementioned contrast reduction. From these copies on such matrix stock, reliefs can be directly obtained and step 1A eliminated; the printing of the original negatives on matrix stock then leads directly to step 1B and positive print P1, which is then employed in the combination according to Fig. 1.

Fig. 3 illustrates, in a manner similar to Fig. 2, an embodiment utilizing integral tripack film material. As shown at 2*a*, a multilayer color original is exposed and developed to furnish three superposed color aspect negatives NI, NII, NIII. These are then reversal exposed whereby a contrast controlling flash exposure can be applied if desired, or the contrast can be controlled by way of the final development in modulation ranges especially selected for purposes of the invention. A color positive P2 results as indicated at 2*b*, which record is suited for incorporation in systems according to the invention.

It will now be evident that all conventional color printing processes can be utilized for purposes of the invention, such as dye transfer, color development with coupler in the solution or emulsion-incorporated, dye bleach, chemical toning, and mordant dyeing. The wash off relief dye transfer process is particularly advantageous because it permits the largest range of dyes and dye mixtures.

Various possibilities of sets of modulating media with abnormal absorption characteristics for purposes of the present invention will now be described; any one of these can be incorporated by suitable techniques including those described above.

The three absorption ranges can be selected wholly independently of the psycho-physiological taking ranges as determined by appropriate means such as filters and emulsion sensitization. Fairly narrow bands can be selected without consideration of visual appearance, to match the most effective regions common to all elements of the modulation channel so far as such regions are effective for transmission and modulation purposes, while retaining the necessary isolation from each other. The selection however should be governed by the consideration that the original blue taking aspect which is conventionally printed in minus blue (yellow) medium is in the least sensitive modulation channel because this spectral range contributes least to physiological definition. On the other hand the green taking aspect normally reproduced in minus green (magenta) coloring matter contributes primarily to the quality of the finally viewed image. Therefore it should be assigned to the most sensitive modulation medium and channel combination. The red taking aspect normally printed in minus red (cyan) is less critical and can therefore be handled with somewhat more freedom, which is the reason for some of the specific absorption ranges herein selected for this range by way of example. An embodiment of this type is illustrated in Fig. 4. It incorporates the blue spectral range for the green aspect channel, the green spectral range for the blue aspect channel and uses the ultraviolet region for the red aspect channel, as clearly indicated in Fig. 4.

While the modulation channels can be freely chosen as pointed out above, for practical purposes it is preferable to retain as far as possible the conventional absorption ranges of the media used for the positive record. If this consideration is of primary importance, conventional media can be used for the blue and green aspect channels whereas an ultraviolet absorbing dye is used for the red aspect channel. An embodiment of this type is illustrated in Fig. 5. A positive record of this type will be unsuited for visual observation of a directly projected image, so that this film is practical mainly for modulation purposes in an electro-optical system as herein described.

It is often desirable to use positive films as herein described not only for electro-optical modulation purposes, but also for direct projection with visual observation on a screen, even if the physiological quality might be somewhat lowered. In an important aspect of the invention this is accomplished by adding an abnormal modulation range to the generally speaking normal or physiologically correct absorption ranges of the record forming media. This is possible in two ways as follows:

A conventional cyan medium can be combined with one that absorbs in an arbitrary modulation range, such as the ultraviolet range. If the media are imbibition transfer dyes, this combination can be applied in two ways, either by mixing the two dyes and applying the mixture during a single run of the imbibition machine, or the two dyes for the channel can be applied separately in which case the complete imbibition transfer is performed in four runs, three for the normal ranges and one for the abnormal range. This embodiment is illustrated in Fig. 6.

Instead of using two separate dyes for the cyan channel, a single medium of special absorption quality can be used. The red aspect medium at *p* of Fig. 1 is a dye of this property. It appears cyan upon visual inspection but has in addition an ultraviolet asborption band which lends itself readily to electronic scanning, in the manner explained with reference to Fig. 1.

Several practical examples of sets of imbibition transfer dyes suitable for purposes of the present invention will now be presented.

A set of imbibition dyes which provide a positive color record of the general type discussed with reference to Fig. 4 consists of:

Calcocid Milling Yellow R (CC) for the blue aspect,
Polar Brilliant Red C Congo (Gy) for the green aspect, and
Amacid Blue A (AAP) for the red aspect.

A set of imbibition dyes which provides a positive color record of the type discussed with reference to Fig. 5 consists of:

Metanil Yellow (Colour Index #138) for the blue aspect,
Acid Magenta S (G) (Colour Index #692) for the green aspect, and 4,4′-dibenzoylamino-stilbene-2,2′ disulfonic acid (sodium salt) which absorbs in the ultraviolet range, for the red aspect.

The above dibenzoylamino stilbene disulfonic acid can also be used for purposes of Fig. 6, together with conventional blue, green and red absorbing dyes.

It should be understood that the present disclosure is for the purpose of illustration only and that this invention includes all modifications and equivalents which fall within the scope of the appended claims.

I claim:

1. Apparatus for transmitting a set of electric signals under the modulating control of motion picture film which records a set of respective color aspect images of an original, by impressing on photoelectric means light that is imagewise modulated by the film, comprising: a motion picture film with a set of reproductions of said color aspect images in colored media, one for each color aspect and at least one selected colored medium transmitting light of a spectral range which is unrelated to the spectral range of its respective color aspect image; means for scanning said film including a scanning source of light, and color selective light dividing means for separately projecting each color aspect reproduction of said film with respective beams of light, each beam having the spectral range that is transmitted by its respective medium including the medium of said unrelated range; and photoelectric means arranged in the path of each of said beams and predominantly responsive to light of the spectral range of the respective beam including a photoelectric means that is predominantly responsive to said unrelated range.

2. For use in apparatus for transmitting a set of electric signals under the modulating control of motion picture film which records a set of respective color aspect images of an original, by impressing on photoelectric means light that is imagewise modulated by the film in beams of light one for each aspect, the spectral range of a beam deviating from that of the corresponding original color aspect image for controlling photoelectric means which respond predominantly to light of the deviating range, a motion picture film which carries a plurality of registered records of said original color aspects, said records being in colored media at least one of which media absorbs a spectral region which is outside of the corresponding original aspect range but approximates the range of the corresponding scanning beam, to average amounts approximating the average absorption of the other media.

3. Apparatus according to claim 1 wherein said selected medium absorbs ultraviolet light, said scanning means projects a beam containing ultraviolet light, and said photoelectric means responds to ultraviolet light.

4. Film according to claim 2 wherein said one medium is a dye which absorbs, in addition to said outside region, a range approximately coextensive with its color aspect range.

5. Film according to claim 2 wherein said outside region of said dye includes an ultraviolet spectral region.

6. Film according to claim 2 wherein one of said media is a mixture of a dye which absorbs a spectral range approximately coextensive with its corresponding color aspect range and of a dye absorbing a range outside of said color aspect range.

References Cited in the file of this patent

UNITED STATES PATENTS

| | | |
|---|---|---|
| 2,161,399 | Yule | June 6, 1939 |
| 2,607,845 | Clark | Aug. 19, 1952 |
| 2,627,547 | Bedford | Feb. 3, 1953 |